United States Patent [19]

Tadokoro et al.

[11] Patent Number: 5,471,358
[45] Date of Patent: Nov. 28, 1995

[54] THIN FILM MAGNETORESISTIVE HEAD WHICH INCLUDES A DOMAIN SUPPRESSING LAYER AND METHOD FOR MANUFACTURING THE SAME

[75] Inventors: Shigeru Tadokoro, Hitachi; Shinji Narishige, Mito; Hiroaki Koyanagi, Hiratsuka; Tetsuo Kobayashi, Kanagawa, all of Japan

[73] Assignee: Hitachi, Ltd., Tokyo, Japan

[21] Appl. No.: 851,927

[22] Filed: Mar. 16, 1992

[30] Foreign Application Priority Data

Mar. 14, 1991 [JP] Japan ................. 3-049811

[51] Int. Cl.$^6$ .............................. G11B 5/39; G11B 5/147
[52] U.S. Cl. ................................. 360/113; 360/126
[58] Field of Search ............................ 360/113, 125, 360/126; 324/252; 338/32 R

[56] References Cited

U.S. PATENT DOCUMENTS

| | | | |
|---|---|---|---|
| 4,103,315 | 7/1978 | Hempstead et al. | 360/113 |
| 4,516,180 | 5/1985 | Narishige et al. | 360/126 |
| 4,639,806 | 1/1987 | Kira et al. | 360/113 |
| 4,663,685 | 5/1987 | Tsang | 360/113 |
| 4,803,580 | 2/1989 | Mowry | 360/113 |
| 5,005,096 | 4/1991 | Krounbi et al. | 360/113 |
| 5,014,147 | 5/1991 | Parkin et al. | 360/113 |
| 5,132,859 | 7/1992 | Andricacos et al. | 360/126 |
| 5,159,513 | 10/1992 | Dieny et al. | 324/252 |
| 5,206,590 | 4/1993 | Dieny et al. | 338/32 R |

FOREIGN PATENT DOCUMENTS 60-159518 10/1985 Japan.

Primary Examiner—A. J. Heinz
Assistant Examiner—Jefferson Evans
Attorney, Agent, or Firm—Antonelli, Terry, Stout & Kraus

[57] ABSTRACT

In a magnetoresistive head, a domain suppressing layer is formed under each of opposite ends of a magnetoresistive film. The domain suppressing layer is composed of a first ferromagnetic film, an antiferromagnetic film and a second ferromagnetic film which are laminated one over another in this order. Since the spin distribution of the antiferromagnetic film is transmitted to the magnetoresistive film via the second ferromagnetic film, a stable longitudinal bias magnetic field can be achieved, irrespective of the degree of contamination of the surface of the ferromagnetic film.

19 Claims, 7 Drawing Sheets

THIN FILM MAGNETORESISTIVE HEAD WHICH INCLUDES A DOMAIN SUPPRESSING LAYER AND METHOD FOR MANUFACTURING THE SAME

BACKGROUND OF THE INVENTION

1. Field of the Invention

This invention relates to a magnetoresistive head, for a magnetic recording apparatus and particularly a magnetic disk apparatus, utilizing the magnetoresistive effect.

2. Description of the Related Art

A magnetoresistive head is currently known as a magnet head which can read data from the magnetic surface of a magnetic recording medium with high sensitivity. A magnetoresistive head converts a magnetic signal on a recording medium into an electrical signal by utilizing the phenomenon whereby the electrical resistance of a magnetoresistive film varies according to the direction of magnetization.

A primary problem with conventional magnetoresistive heads is that Barkhausen noise would occur as a domain wall existing in the magnetoresistive film is irregularly moved due to a signal field.

U.S. Pat. No. 4,103,315 discloses, as an attempt to eliminate a domain wall of a magnetoresistive film and so suppress noise, a concept of utilizing the antiferromagnetic-ferromagnetic exchange coupling by causing an unidirectional magnetic bias field to occur due to an antiferromagnetic layer mounted entirely on one surface of the magnetoresistive film.

Here in the present specification, a layer for applying a longitudinal bias field to a magnetoresistive film in order to suppress any domain wall in the magnetoresistive film is defined as "a domain suppressing layer". The term "exchange coupling" means to make the spin ordering of a ferromagnetic film coincide with the spin ordering of an antiferromagnetic film at the interface region of these films.

In the structure disclosed in U.S. Pat. No. 4,103,315, since the antimagnetic film is laminated entirely over one surface of the magnetoresistive film to provide a domain suppressing layer, the exchange coupling would become increased. As a result, a relatively intense signal field from the magnetic recording medium is needed to turn the direction of magnetization of the magnetoresistive film, thus lowering the sensitivity of the magnetoresistive film with respect to the signal field.

The foregoing problem in the prior art was solved by a concept of patterning the domain suppressing layer and locating the patterned domain suppressing layer only over each of opposite ends of the magnetoresistive film. This concept is disclosed in U.S. Pat. No. 4,663,685. An antiferromagnetic film, serving as the domain suppressing layer for applying a bias field in the longitudinal direction of to the magnetoresistive film, is located only over each of opposite ends of the magnetoresistive film to keep the film end in a single domain state, thus causing a single domain state also in a magnetosensitive portion disposed at the center of the magnetoresistive film.

This prior art has the following problems. The antiferromagnetic film acting as a domain suppressing layer must be formed over each end of opposite ends of the magnetoresistive film which is previously patterned in a predetermined size. On the other hand, an exchange coupling must be caused between the antiferromagnetic film and a ferromagnetic film, which serves as the magnetoresistive film. Since this exchange coupling interaction runs only a short distance (about a single atom layer), the two films must be formed in atomically intimate contact with each other. Therefore, the magnetoresistive film surface contaminated such as by oxides must be cleaned before having the antiferromagnetic film formed over it.

Partly because the cleaning step must be added and partly because a magnetoresistive film usually has a thickness of hundreds of angstroms, which is very small, the magnetoresistive film is highly prone to damage during this cleaning step. Therefore, the magnetic characteristic is impaired. If such cleaning is not uniform, the magnetoresistive film will vary in thickness so that there is a difference in magnetic characteristic between various magnetic heads. If the cleaning is insufficient, the strength of exchange coupling between the magnetoresistive film and the antiferromagnetic film will be inadequate so that there is a possibility that each of opposite ends of the magnetoresistive film may not become a single domain. When it does not become a single domain, there will exist a domain wall in the magnetoresistive film so that Barkhausen noise occurs due to the irregular movement of the domain wall. The resulting magnetic head is not suitable for use in a high-density magnetic recording device.

Another problem with the prior art is that since the antiferromagnetic film is formed directly on the magnetoresistive film, the material for the antiferromagnetic film is limited to such a material which has a lattice structure similar to that of the magnetoresistive film. The exchange coupling between a magnetoresistive film, which is a ferromagnetic film, and an antiferromagnetic film is nonstable; it is therefore necessary to use the same lattice structure for both the ferromagnetic film and the antiferromagnetic film so that a fine exchange coupling is formed.

Further, since the antiferromagnetic film serving as a domain suppressing layer is formed directly over the magnetoresistive film, the strength of exchange coupling between the magnetoresistive film and the antiferromagnetic film is necessarily determined only according to the material of both the magnetoresistive film and the antiferromagnetic film. On the other hand, the strength of exchange coupling depends on the longitudinal bias field of the magnetoresistive film and is a quantity which needs to be controlled to an optimum value for the structure of a magnetoresistive head. With this prior art, however, only by changing the material, the strength of exchange coupling can be controlled.

SUMMARY OF THE INVENTION

A first object of this invention is to provide a magnetoresistive head in which a domain suppressing layer is formed at each of opposite ends of a magnetoresistive film, without the need for cleaning of the magnetoresistive film, which would cause noise and variance of the magnetic characteristic.

A second object of the invention is to provide a magnetoresistive head in which an antiferromagnetic material can be selected relatively freely and, the strength of exchange coupling can be controlled without changing the material of both the magnetoresistive film and the antiferromagnetic film.

A third object of the invention is to provide a method for manufacturing a magnetoresistive head which is free from scattering of performance due to variable performance due to variance of the magnetic characteristic of a domain suppressing layer.

According to a first aspect of the invention, there is provided a magnetoresistive head comprising: a magnetoresistive film; and a domain suppressing layer disposed at each of opposite end portions of the magnetoresistive film for making the magnetoresistive film a single domain, the domain suppressing layer being a multilayer film disposed under the magnetoresistive film.

According to a second aspect of the invention, there is provided a method for manufacturing a magnetoresistive head which has a domain suppressing layer at each of opposite ends of a magnetoresistive film for making the magnetoresistive film a single domain, comprising the steps of: forming the domain suppressing layer; shaping the domain suppressing layer into a target pattern by etching; and forming the magnetoresistive film over the target pattern of domain suppressing layer.

The domain suppressing layer may be a three-layer film including a first ferromagnetic film, an antiferromagnetic film and a second ferromagnetic film which are laminated on top of one another in this order. Alternatively, the domain suppressing layer may be a two-layer film including an antiferromagnetic film and a ferromagnetic film which are laminated over one another in this order. The domain suppressing layer may also be a three-layer film including a nonmagnetic crystalline film, an antiferromagnetic film and a ferromagnetic film which are laminated over one another in this order, or a four-layer film including a first ferromagnetic film, an antiferromagnetic film, a second ferromagnetic film and a third ferromagnetic film which are laminated over one another in this order.

In forming the domain suppressing layer by sputtering, two or more targets are located within a common vacuum container. In forming the domain suppressing layer by vacuum evaporating, two or more evaporation sources are located within a common vacuum container. Domain suppressing layers are formed continuously, without removing the objects to be sputtered, so that variance of the magnetic characteristic between various domain suppressing layers is minimized.

The domain suppressing layer as an undivided whole may be patterned by a method such as ion milling.

With the magnetoresistive head of this invention, since an uppermost film of the domain suppressing layer is a ferromagnetic film, the central region of the magnetoresistive film for detecting a magnetic signal from the recording medium is not exchange-coupled directly with the antiferromagnetic film. In the central region of the magnetoresistive film, since there is no increased anisotropic field of the magnetoresistive film, the sensitivity of a magnetoresistive element will not be lowered.

Further, since the longitudinal bias field which occurs due to the domain suppressing layer, located under the end of the magnetoresistive film, suppresses any domain wall which might occur in the central region of the magnetoresistive film, it is possible to suppress Barkhausen noise resulting from the irregular movement of the domain wall. Since the spin ordering of the antiferromagnetic film is transmitted to the magnetoresistive film via the ferromagnetic film located on the domain suppressing layer as the uppermost film, it is possible obtain a stable longitudinal bias field without cleaning the domain suppressing layer. The reason for this is that the exchange coupling force between the ferromagnetic films is stable and strong compared to the exchange coupling force between the antiferromagnetic film and the ferromagnetic film and therefore does not depend very much on the surface state of the domain suppressing layer.

By varying the thickness of the ferromagnetic film which is the uppermost film of the domain suppressing layer, it is possible to control the strength of the longitudinal bias field to be applied to the magnetoresistive film. The reason for this is that the exchange coupling force between the antiferromagnetic film and the magnetoresistive film can be controlled according to the thickness of the ferromagnetic film existing between the antiferromagnetic film and the magnetoresistive film.

If the antiferromagnetic film and the magnetoresistive film are to be brought into direct contact with each other, the material for the antiferromagnetic film is limited to a material, such as a Fe-Mn alloy, which causes an exchange coupling with the magnetoresistive film material which is a material such as a Ni-Fe alloy or a Ni-Fe-Co alloy. In the domain suppressing layer of this magnetoresistive head, by selecting the material of the ferromagnetic film or the nonmagnetic crystalline layer located over and under the antiferromagnetic film, an antiferromagnetic material which has difficulty causing exchange coupling directly with the magnetoresistive film material such as a Cr-Al alloy, a Cr-Mn alloy or Ni oxide can be used as the material for the antiferromagnetic film.

According to this invention, since the domain suppressing layer is formed and processed before the magnetoresistive film is formed, there is no danger that the magnetoresistive film might be damaged during the step of forming the domain suppressing layer. Therefore the domain suppressing layer as an undivided whole can be patterned easily by a method such as ion milling. The domain suppressing layer of this magnetoresistive head can be manufactured without causing the antiferromagnetic-ferromagnetic portion, the exchange coupling of which is non-stable, to be exposed to the atmosphere. The domain suppressing layer can therefore be manufactured easily and stably with excellent reproducibility.

DETAILED DESCRIPTION OF THE PREFERRED EMBODIMENTS

Figure 6:
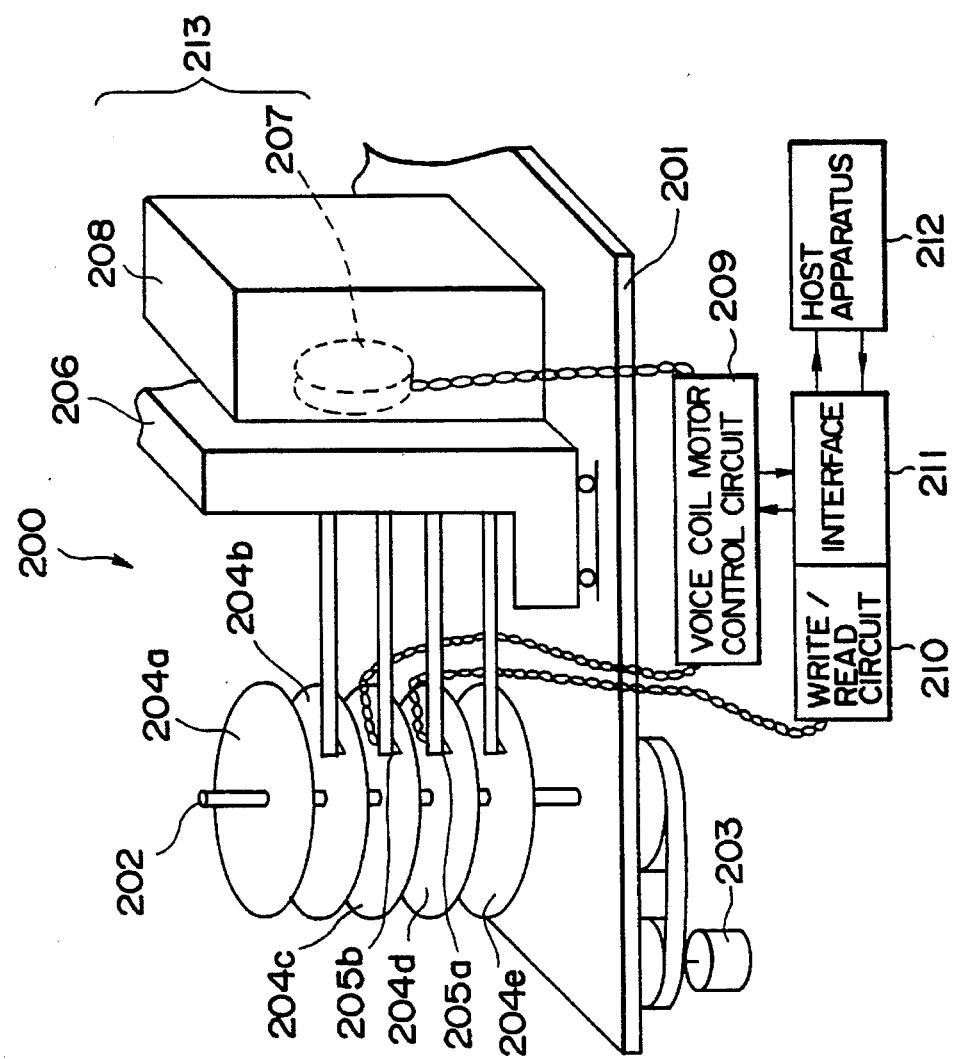
FIG. 6 is a perspective view showing a magnetic disk apparatus using the magnetoresistive head of this invention.

FIG. 6 shows a magnetic disk apparatus 200 in which a magnetoresistive head of this invention is incorporated.

As shown in FIG. 6, the magnetic disk apparatus 200 generally comprises a plurality of magnetic disks 204a, 204b, 204c, 204d, 204e mounted on a spindle 202 regularly spaced therealong, a motor 203 for driving the spindle 202, a magnetic head assembly 205a, 205b supported by a movable carriage 206, a voice coil motor 213 for driving the carriage 206, and a base 201 supporting these parts. The voice coil motor 213 includes a magnet 208 and a voice coil 207. The magnetic disk apparatus 200 also includes a voice coil motor control circuit 209 for controlling the voice coil motor 213 according to a signal sent from a host apparatus 212 such as a magnetic disk control apparatus. A write/read circuit 210 is connected to the host apparatus 212 via an interface 211. The write/read circuit 210 has a function of converting data, sent from the host apparatus 212, into a current to flow in the magnetic heads according to a writing system, and a function of amplifying data sent from the magnetic disk 204a, for example, and converting the amplified data into a digital signal.

The reading operation of the magnetic disk apparatus 200 will now be described. An instruction for data to be read is given from the host apparatus 212 to the voice coil motor control circuit 209 via the interface 211. By a control current from the voice coil motor control circuit 209, the voice coil motor 213 drives the carriage 206 to move the magnetic head assembly 205a, 205b at a high speed to a track where the designated data is stored, thus positioning the magnetic head assembly 205a, 205b precisely. In this positioning, the positioning magnetic head 205b connected to the voice coil motor control circuit 209 detects a designated position on the magnetic disk 204c and so controls the position of the data magnetic head 205a. The motor 203 supported by the base 201 drives the spindle 202 to rotate the plurality of 3.5 inch magnetic disks 204a, 204b, 204c, 204d, 204e. According to a signal from the write/read circuit 210, a designated magnetic head is selected to detect a leading position of the designated region, whereupon a data signal on the magnetic disk is read. To perform this reading, the data magnetic head 205a connected to the write/read circuit 210 gives and receives signals to and from the magnetic disk 204d. The read data is converted into a predetermined signal, which is then sent to the host apparatus 212.

For a high-performance magnetic disk apparatus, it is preferable that the plane recording density is at least 50M bits/inch$^2$, the line recording density is at least 25K bits/inch and the track density is at least 2000 tracks/inch. A magnetoresistive head according to this invention is free from any domain wall and hence Barkhausen noise and is therefore high sensitive. Using this magnetoresistive head, it is possible to manufacture a magnetic disk apparatus having a magnetic disk whose recording density is 300 to 400M bits/inch$^2$ and whose residual magnetization is 0.5 to 0.8T.

Figure 1:
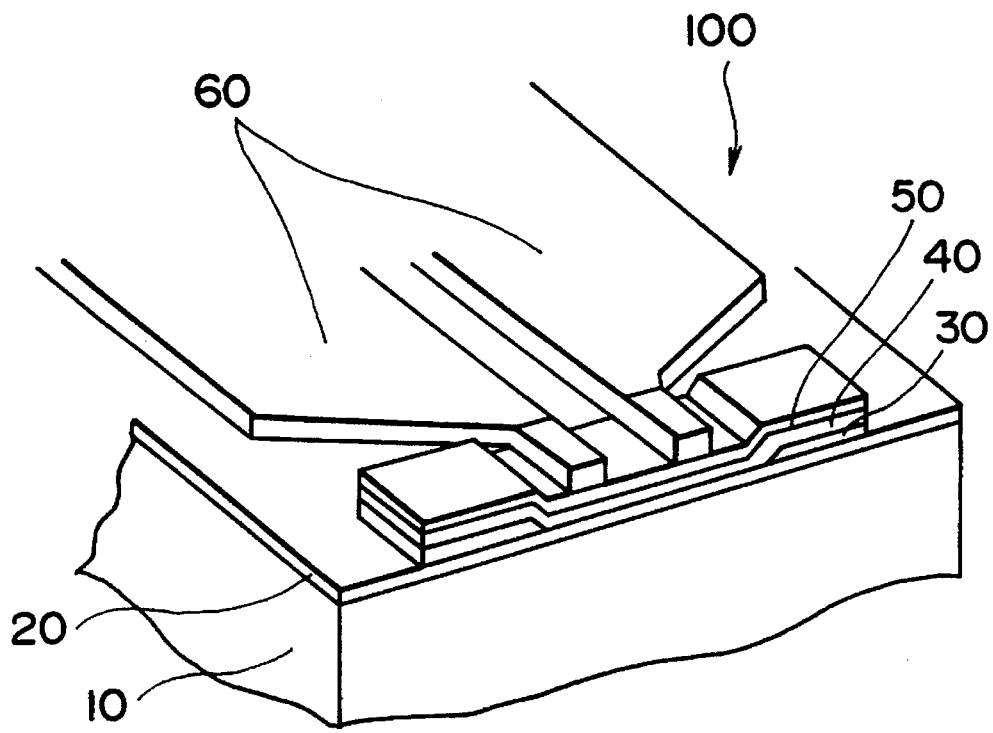
FIG. 1 is a fragmentary perspective view showing a magnetoresistive head according to this invention.

A magnetoresistive head 100 to be used in the magnetic disk apparatus 200 will now be described with reference to FIGS. 1 and 7.

Figure 7:
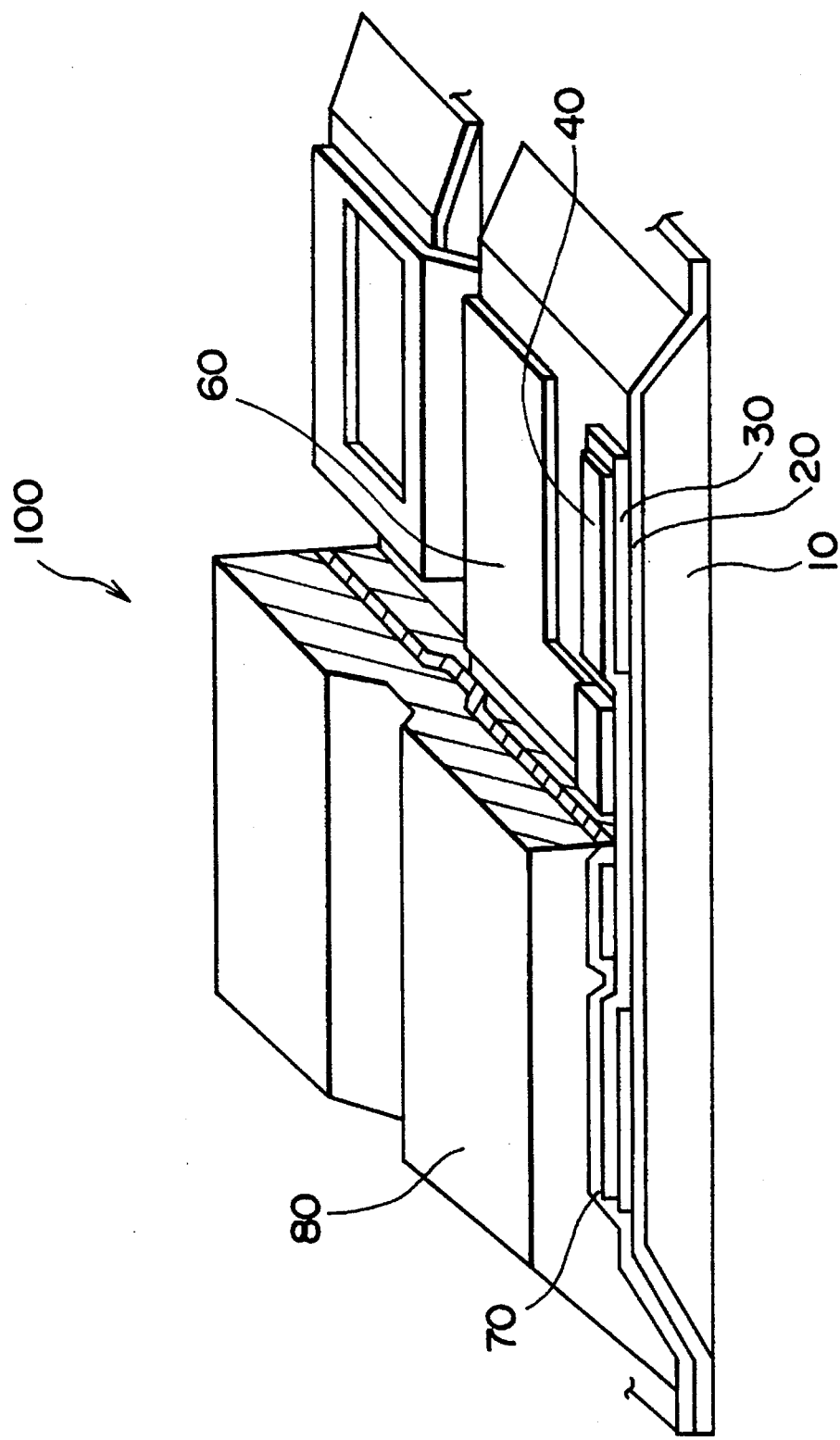
FIG. 7 is a perspective view showing the entire magnetoresistive head of this invention.

As shown in FIG. 7, the magnetoresistive head 100 comprises a lower magnetic shielding layer 10, a lower gap film 20 formed over the lower magnetic shielding layer 10, a pair of domain suppressing layers 30, 30 formed on the lower gap film 20 at respective predetermined positions with a predetermined space therebetween, a magnetoresistive film 40 formed in contact with the lower gap film 20 between the two domain suppressing layers 30, 30 and covering the upper surfaces thereof, a shunt film 50 formed over the magnetoresistive film 40, a signal take-out electrode 60 formed on the shunt film 50, an upper gap film 70 formed so as to cover the foregoing films 20, 40, 50, the foregoing layers 10, 30 and the signal lake-out electrode 60, and an upper magnetic shielding layer 80 formed over the upper gap film 70. In FIG. 1, the upper gap film 70 and the upper magnetic shielding layer 80 are omitted.

The actions and materials for the individual layers and films will now be described. The upper and lower magnetic shielding layers 80, 10 prevent the magnetoresistive film 40 from being influenced by any field other than the signal field, thus improving the signal resolution of the magnetoresistive head 100. The material of the upper and lower magnetic shielding layers 80, 10 is a soft ferromagnetic material, such as a Ni-Fe alloy or a noncrystalline Co alloy, and the thickness of each magnetic shielding layer 80, 10 is about 0.5 to 3 μm.

The upper and lower gap films 70, 20 is located contiguously to the magnetic shielding layers 80, 10 so that a magnetoresistive element comprising the magnetoresistive film 40, the signal takeout electrode 60 and the domain suppressing layer 30 is interposed between the upper and lower films 70, 20. The upper and lower films 70, 20 act to electrically and magnetically isolate the magnetoresistive element from the upper and lower magnetic shielding layer 80, 10 and comprise a nonmagnetic insulating substance such as glass or alumina. The thickness of each of the upper and lower gap films 70, 20 is usually in the range of 0.4 to 0.10 μm, depending on the recording density preferred for the magnetic head, since this thickness is influential on the reproducing resolution of the magnetoresistive head 100.

The magnetoresistive element to be formed between the upper and lower gap films 70, 20 comprises the magnetoresistive film 40 whose electrical resistance varies according to the magnetic field, the signal take-out electrode 60 for causing a signal detecting current to flow in the magnetoresistive film 40, and the domain suppressing layer 30 disposed at each of opposite ends of the magnetoresistive film 40 for giving to each film end a longitudinal bias field so as to make the film end a single domain.

The domain suppressing layer 30 is formed only at each end of the magnetoresistive film 40 for giving a longitudinal bias field to the magnetoresistive film 40 intense enough to keep each film end in a single domain state. As a result, no domain wall will occur in the magnetoresistive film 40 and so Barkhausen noise will be reduced. As long as the length of the central region of the magnetoresistive film 40 is not too long, the central region will also be forcibly made a single domain if the film ends are kept in a single domain state. With this structure, since the direction of magnetic moment of the central region is varied easily, there is no danger that the sensitivity will be lowered, which would have been the case if the domain suppressing layer was formed under the whole magnetoresistive film.

The magnetoresistive film 40 is a ferromagnetic film, such as a Ni-Fe alloy, a Ni-Co alloy or a Ni-Fe-Co alloy, whose electrical resistance varies according to the direction of magnetization and whose thickness is about 0.01 to 0.045 μm.

The signal take-out electrode conductor 60 is usually a film such as copper or gold whose electrical resistance is small enough for adequate current (e.g., about $1 \times 10^6$ to $1 \times 10^7$ A/cm$^2$) to flow in the magnetoresistive film 40.

The shunt film 50 gives to the magnetoresistive film 40 a lateral bias field intense enough to make the magnetoresistive film 40 highly sensitive. The method of using a shunt film for the application of a lateral bias field is called "the shunt biasing method". In the shunt biasing method, as a shunt film, a thin film of metal such as Ti, Nb, Ta, Mo or W is formed on the magnetoresistive film 40. Usually the thickness of the shunt film 50 is about 0.01 to 0.04 μm. Also in the shunt biasing method, since the lateral bias field is varied by a current flowing in the shunt film 50, it is necessary to control the resistivity commensurate with the thickness of the shunt film 50. The value of resistivity of the shunt film 50 is usually about one to four times the value of resistivity of the magnetoresistive film 40.

There are other methods suitable for the production of high-density magnetoresistive heads, such as the self-biasing method and the soft film biasing method, in which a lateral bias field intense enough to make the magnetoresistive film highly sensitive is applied to the magnetoresistive film. In either biasing method, a layer for applying a lateral bias field to a magnetoresistive element is formed contiguously to the magnetoresistive element.

In the self-biasing method, a magnetic field occurring according to a current flowing in the magnetoresistive element is utilized and, since the lateral bias field is intensified by a magnetic shielding layer, it is important to locate the magnetoresistive film contiguously to the magnetic shielding layer.

In the soft film biasing method, a ferromagnetic film having a soft magnetic characteristic is formed contiguously to the magnetoresistive film via a nonmagnetic layer, and a magnetic field which occurs according to a current in the magnetoresistive film is efficiently applied to the magnetoresistive film. Alternatively, a composite biasing method including the foregoing methods in a desired combination may be used.

The method of manufacturing the magnetoresistive head 100 will now be described. The following film making method and patterning method are accomplished by conventional methods such as the sputtering method and the etching method.

A lower magnetic shielding layer 10 is formed of a Ni-Fe alloy so as to have a thickness of 2 μm, and then over the lower magnetic shielding layer 10, a lower gap film 20 is formed of alumina so as to have a thickness of 0.3 μm. The lower magnetic shielding layer 10 and the lower gap film 20 are then processed into respective predetermined shapes. At that time, the ends of the lower magnetic shielding layer 10, as shown in FIG. 7, are processed so as to be inclined with respect to the surface of the base. The reason for this is that the signal take-out electrode 60 formed so as to cover the lower magnetic shielding layer 10 is prevented from disconnecting at the ends of the lower magnetic shielding layer 10. Then, a domain suppressing layer 30 is formed over the lower gap film 20. This domain suppressing layer 30 is patterned in such a manner that only portions corresponding to the ends of the magnetoresistive film 40 are left as residuals. The method of forming the domain suppressing layer 30 itself is explained later. As a result, the domain suppressing layer 30 has been made if a pair of layers. Then over the domain suppressing layer 30 and the lower gap film 20 between the pair of the domain suppressing layers 30, a magnetoresistive film 40 is formed of a Ni-Fe alloy so as to have a thickness of 400 angstroms, and a shunt film 50 is formed of niobium so as to have a thickness of 400 angstroms. Due to the magnetic field which occurs according to a current flowing in, the shunt film 50, it gives to the magnetoresistive film 40 a lateral bias field intense enough to make the magnetoresistive film 40 highly sensitive. Subsequently, a two-layer film of gold and titanium, as the signal take-out electrode 60, is formed so as to have a thickness of 0.1 μm and is processed, and thereover an upper gap film 70 is formed of alumina so as to have a thickness of 0.3 μm. Then, an upper magnetic shielding layer 80 is formed of a Ni-Fe alloy so as to have a thickness of 2 μm, and a protective film is formed of alumina. Thus the production of the magnetoresistive head 100 is completed. In FIG. 1, the upper gap film 70, the upper magnetic shielding layer 80 and the protective film are omitted, and in FIG. 7, the protective film is omitted.

The magnetoresistive head of this invention has a domain suppressing layer at each end of the magnetoresistive film which gives to the magnetoresistive film a longitudinal bias field intense enough to make the magnetoresistive film end a single domain so that any domain is suppressed even in a magnetosensitive region of the center of the magnetoresistive film and so Barkhausen noise is prevented.

In the production of the magnetoresistive head, since the magnetoresistive film is formed after the domain suppressing layer has been formed, the ferromagnetic film as the uppermost layer of the domain suppressing layer contacts the ferromagnetic magnetoresistive film so that a stable and strong magnetic coupling can be achieved without cleaning the surface of the domain suppressing layer.

The structural features of the domain suppressing layer will now be described.

As the first feature, utilizing the spin ordering of the antiferromagnetic film near the interface between the antiferromagnetic film and the ferromagnetic film, the domain suppressing layer orients the magnetization of the ferromagnetic film in a single direction by such an exchange coupling as to make the spin direction of the ferromagnetic film substantially coincide with that near the surface of the antiferromagnetic film, thus making the magnetoresistive film a single domain. As the second feature, the uppermost layer (to contact the magnetoresistive film) of the domain suppressing layer is a ferromagnetic film. With this arrangement, the antiferromagnetic film of the domain suppressing layer will be coupled with the magnetoresistive film via the ferromagnetic film. As a result, even if the surface of the domain suppressing layer is contaminated to some degree while being patterned, the strength of coupling between the domain suppressing layer and the magnetoresistive film is not affected. The antiferromagnetic-ferromagnetic coupling is weak, and therefore this coupling cannot be accomplished, if the surface of the antiferromagnetic film is not clean. On the other hand, the ferromagnetic-ferromagnetic coupling is strong and does not depend very much on the surface state of the domain suppressing layer.

Figure 2:
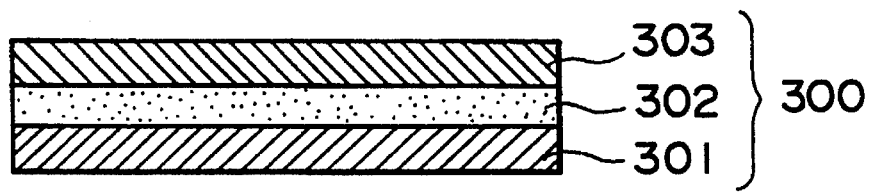
FIG. 2 is a cross-sectional view showing one example of domain suppressing layer of the magnetoresistive head.

FIG. 2 shows a domain suppressing layer 300 in the form of a laminate which includes a first ferromagnetic film 301, an antiferromagnetic film 302 and a second ferromagnetic film 303.

In manufacturing the domain suppressing layer 300, it is desirable that various films of the domain suppressing layer 300 should be formed continuously in the same vacuum container. The reason is that partly because the domain suppressing layer 300 includes an antiferromagnetic-ferromagnetic coupling and partly because the strength of this coupling depends sensitively on the degree of cleanness of the film surface, the formed films have to be prevented from being contaminated. Consequently, in the same vacuum container, various films of the domain suppressing layer are continuously formed by using a sputtering apparatus in which two targets of a Fe-Mn alloy and a Ni-Fe alloy are to be placed. Therefore the domain suppressing layer can be manufactured stably with good reproducibility. In this film making, a resist pattern is formed by the usual photolithographic technology, and the films as a unit are patterned by an etching technology such as the ion milling method. Since these methods are simple and enable the stable processing of the domain suppressing layer with high precision, the quality of the resulting domain suppressing layer is consistent.

Specifically, firstly a first ferromagnetic film 301 is formed of a Ni-Fe alloy so as to have a thickness of 200 angstroms, then an antiferromagnetic film 302 is formed of a Fe-Mn alloy so as to have a thickness of 100 to 400 angstroms, and thereover a second ferromagnetic film 303 is formed of a Ni-Fe alloy so as to have a thickness of 100 to 400 angstroms, whereupon the resulting laminate is patterned in a predetermined shape.

While the antiferromagnetic film 302 is being formed, the first ferromagnetic film 301 is kept in a magnetically saturated state in the longitudinal direction of the magnetoresistive film. The reason for this is that the spins of the antiferromagnetic film 302 are easily arranged in the direction of magnetization of the first ferromagnetic film 301, namely, in the direction of the external field to be applied when forming the antiferromagnetic film 302.

Further, the first ferromagnetic film 301 serves as a ground layer when forming the antiferromagnetic film 302 of a Fe-Mn alloy. As is well known in the art, in the Fe-Mn alloy, only the gamma phase of a face-centered cubic structure has a Néel temperature equal to or higher than room temperature. However, since the stably existing temperature in this gamma phase is high, the gamma phase cannot be formed as a stable phase by the usual manufacturing method such as the sputtering method. In the domain suppressing layer 300, a Ni-Fe alloy layer as the first ferromagnetic film 301 has a face-centered cubic structure. Therefore, if a Fe-Mn alloy layer is formed over the first ferromagnetic film 301 in the face-centered cubic structure, a Fe-Mn alloy layer as the antiferromagnetic film 302 grows epitaxially so that a gamma phase is formed stably in the face-centered cubic structure. However, when the thickness of the Fe-Mn alloy layer is increased, the phase at the upper portion of the Fe-Mn alloy layer transits from the gamma phase to the alpha phase, which does not have a Néel temperature higher than room temperature due to the uniqueness of the original crystalline structure. It was discovered that in this domain suppressing layer 300, the threshold thickness of the Fe-Mn alloy layer, with which this transition occurs, is about 1000 angstroms. It was also discovered that with the film thickness larger than about 1000 angstroms, since the antiferromagnetic film 302 of the Fe-Mn alloy would become the alpha phase, the antiferromagnetic-ferromagnetic coupling scarcely occurs between the antiferromagnetic film 302 and the second ferromagnetic film 303 so that the domain suppressing layer cannot be formed.

Figure 3:
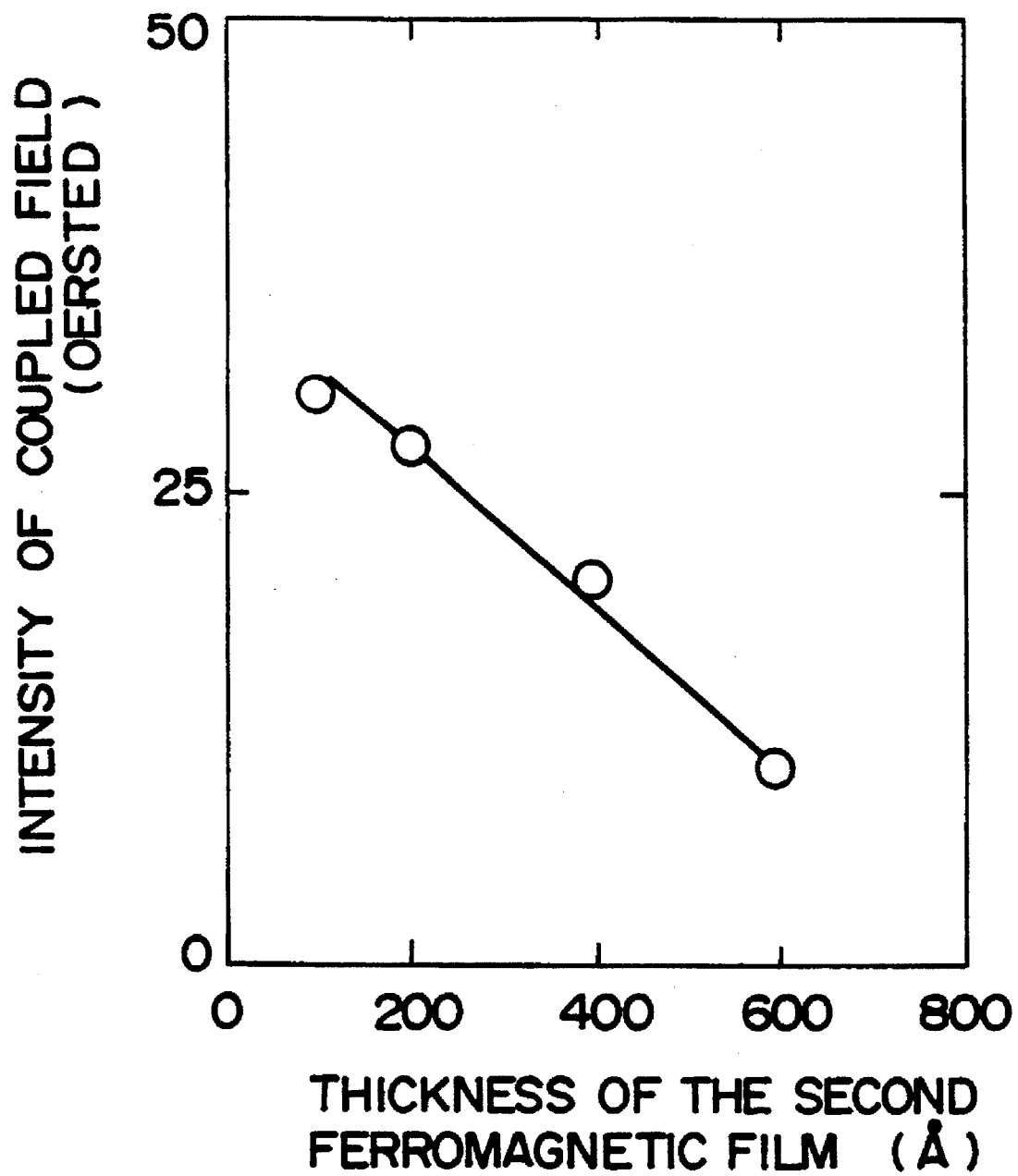
FIG. 3 is a graph showing the relationship between the thickness of a ferromagnetic film and the intensity of a coupled field.

FIG. 3 shows the relationship between the thickness of the second ferromagnetic film 303 and the intensity of the coupled field. The y coordinate is the intensity of the coupled field, and the x coordinate is the thickness of the second ferromagnetic film. The intensity of the coupled field means a quantity by which the magnetization curve of the ferromagnetic film is shifted in the direction of spin ordering of the antiferromagnetic film due to the antiferromagnetic-ferromagnetic coupling between a Ni-Fe alloy layer as the ferromagnetic film and a Fe-Mn alloy layer as the antiferromagnetic film. Here the quantity shifted from the magnetization curve measured by a B-H loop tracer is defined as "coupled field".

The values shown in FIG. 3 represent the intensity of the coupled field with respect to the thickness of the second ferromagnetic film, in the case where as the domain suppressing layer, the first ferromagnetic film is formed of a Ni-Fe alloy so as to have a thickness of 200 angstroms, the antiferromagnetic film is formed of a Fe-Mn alloy so as to have a thickness of 100 angstroms, and the second ferromagnetic film is formed of Ni-Fe alloy so as to have a thickness of 100 to 600 angstroms, and over the domain suppressing layer, a magnetoresistive film is formed of a Ni-Fe alloy so as to have a thickness of 400 angstroms. As is apparent from FIG. 3, the intensity of the coupled field varies according to the thickness of the second ferromagnetic film. The coupled field only requires an intensity large enough to make the ends of the magnetoresistive film a single domain. Since a coupled field of a higher intensity than necessary would be a cause for lowering the sensitivity of the magnetoresistive film, this intensity should preferably be controlled by the shape of the domain suppressing layer.

The intensity of this coupled field can be varied by varying the thickness of the second ferromagnetic film of the domain suppressing layer so that an optimum magnetoresistive element can be designed. In this example, the second ferromagnetic film is formed in a vacuum container and is then taken out from the vacuum container and exposed to the atmosphere, whereupon the resulting second ferromagnetic film is placed back in the vacuum container and a magnetoresistive film is then formed of a Ni-Fe alloy. The intensity of the coupled field was found to be identical with that in the case where after the second ferromagnetic film had been formed, the magnetoresistive film was formed continuously without exposing the second ferromagnetic film to the atmosphere. As a result, it was found that the antiferromagnetic-ferromagnetic coupling between the antiferromagnetic and the magnetoresistive film via the second ferromagnetic film was stable.

Figure 8:
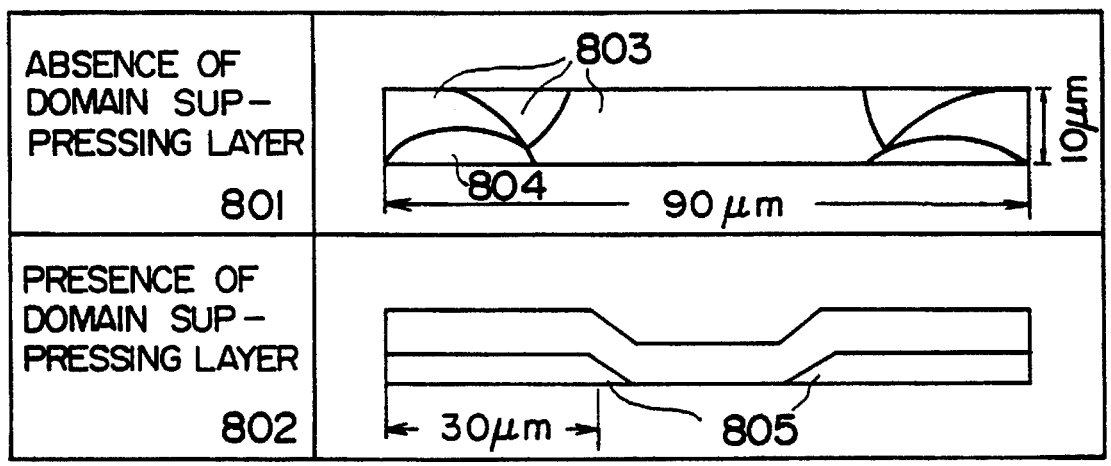
FIG. 8 is a diagram showing the difference in domain structure between the magnetoresistive film in the presence of a domain suppressing layer and the magnetoresistive film in the absence of a domain suppressing layer.
Figure 9:
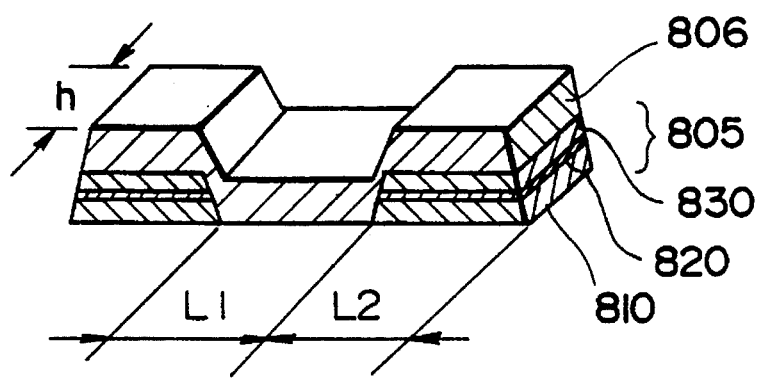
FIG. 9 is a perspective view showing a domain suppressing layer and a magnetoresistive film.

The relationship between the size of the domain suppressing layer and the domain state of the magnetoresistive film will now be explained with reference to FIGS. 8 and 9. FIG. 8 is a diagram showing the difference in domain structure between the magnetoresistive film in the presence of a domain suppressing layer and the magnetoresistive film in the absence of any domain suppressing layer. FIG. 9 is a perspective view showing a domain suppressing layer and a magnetoresistive film.

In FIG. 8, the upper sketch shows the case 801 in the absence of any domain suppressing layer, and the lower sketch shows the case 802 in the presence of a domain suppressing layer. As shown in FIG. 9, a magnetoresistive film 806 has a width h of 10 μm and a total length (L1+L2+L2) of 90 μm. A domain suppressing layer 805 is formed at each of opposite end portions L2 (having a length of 30 μm) of the magnetoresistive film 806. The domain suppressing layer 805 is a three-layer film which includes a first ferromagnetic film 810 of a Ni-Fe alloy having a thickness of 200 angstroms, an antiferromagnetic film 820 of a Fe-Mn alloy having a thickness of 100 angstroms, and a second ferromagnetic film 830 of a Ni-Fe alloy having a thickness of 100 angstroms. The magnetoresistive film 806 has a thickness of 400 angstroms. The domain structure was observed by the Bitter method.

As shown in FIG. 8, in the case 801, a domain 803 will occur at each end of the magnetoresistive film 806. When such a domain 803 occurs, its domain wall 804 is moved irregularly due to a signal field from the recording medium and hence will be a cause for so-called Barkhausen noise when reproducing a signal.

In the case 802, no domain will occur. The reason is that each of opposite ends of the magnetoresistive film 806 will be made a single domain by the action of the domain suppressing layer 805, and as a result, the signal detection portion (corresponding to the central portion L1) will also be made a single domain. Therefore no domain will occur, and hence no noise will occur when reproducing a signal.

Figure 10:
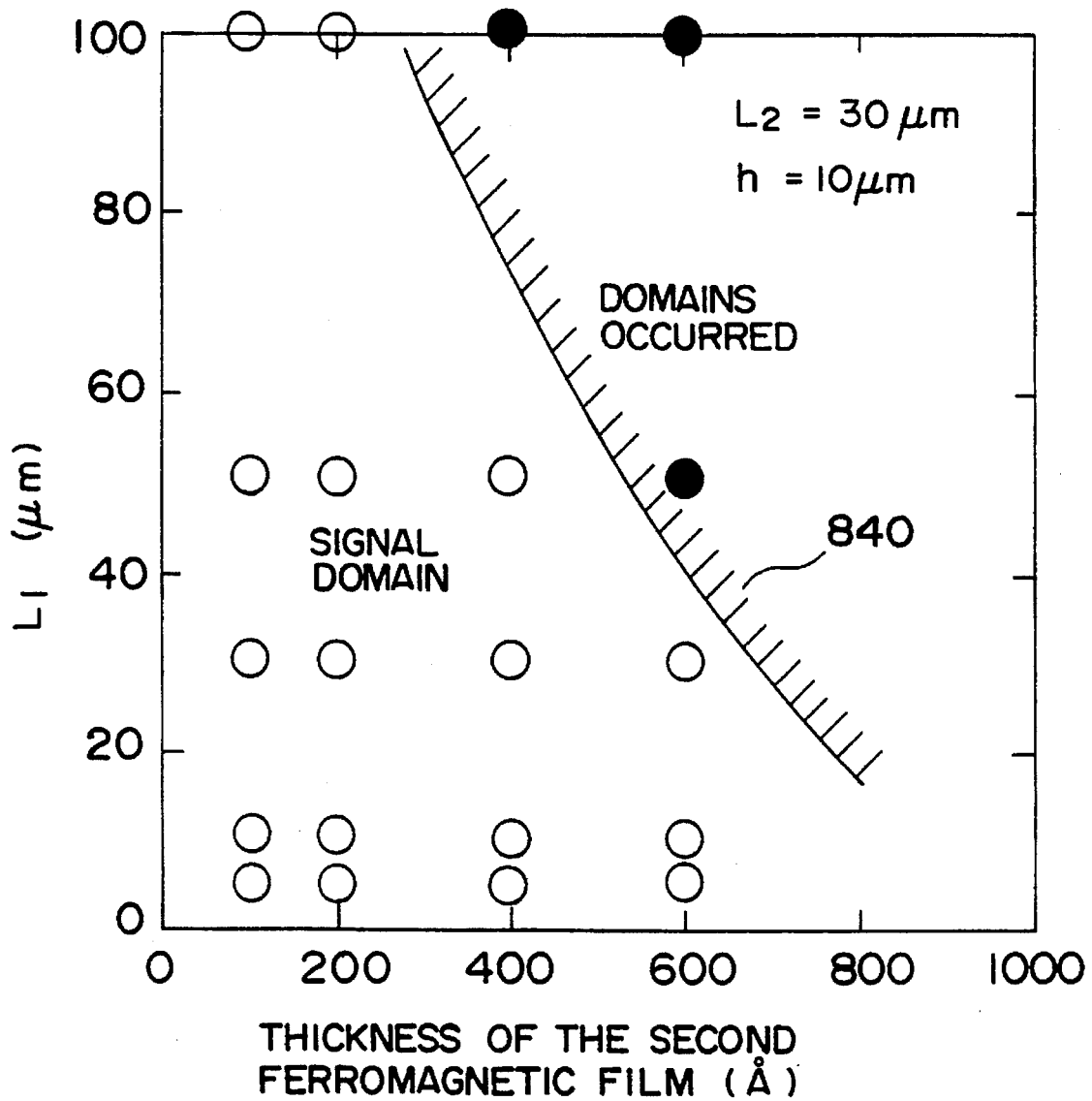
FIG. 10 is a graph showing the change of domain state of the magnetoresistive film.

FIG. 10 shows how the domain state of the magnetoresistive film varies according to the size of the domain suppressing layer and the magnetoresistive film.

In FIG. 10, the x coordinate is a thickness of the second ferromagnetic film (corresponding to the second ferromagnetic film 830 of FIG. 9) of the domain suppressing layer, and the y coordinate is a length (corresponding to L1 of FIG. 9) of the central portion (devoid of a domain suppressing layer) of the magnetoresistive film. The sample used in this experiment is identical with that of FIG. 9 except for the length L1; the width h of the magnetoresistive film is 10 μm, and the domain suppressing layer is formed at each end portion L2 (30 μm) of the magnetoresistive film. In FIG. 10, a circle represents the case in which each of the magnetoresistive film was made a single domain, and a solid black ● represents the case in which domains occurred.

This experiment shows that since the domain suppressing layer is formed only at each end of the magnetoresistive film, a sufficient intensity of longitudinal bias field cannot be applied to the central portion of the magnetoresistive film if the central portion is long, thus causing domains to occur. If the thickness of the second ferromagnetic film of the domain suppressing layer is large, the intensity of exchange coupling between the magnetoresistive film and the domain suppressing layer is small, thus causing domains to occur.

This experiment also shows that in the region above and to the right of an inclined line 840 of FIG. 10, the magnetoresistive film is not made a single domain even in the presence of the domain suppressing layer. For example, if L1=30 μm, the magnetoresistive film can be made a single domain when the thickness of the second ferromagnetic film of the domain suppressing layer is at most 600 angstroms.

In this experiment, a Ni-Fe alloy layer like the magnetoresistive film was used for the first and second ferromagnetic films, and a Fe-Mn alloy layer was used for the antiferromagnetic film. As long as they cause an antiferromagnetic-ferromagnetic coupling, the materials should by no means be limited to these specific examples. Because the second ferromagnetic film to be coupled with the antiferromagnetic film is only required to transmit the spin ordering of the antiferromagnetic film to the magnetoresistive film located thereover, the material for the second ferromagnetic film can be selected, irrespective of the magnetic characteristics such as a coercive force and an anistoropic field, thus guaranteeing a wide range of selection for the material of the second ferromagnetic film.

However, in the case where the second ferromagnetic film has a body-centered cubic structure such as of Fe, since the lattice structure of the second ferromagnetic film is different from that of a Ni-Fe alloy layer used as the magnetoresistive film, the lattice structure of the Ni-Fe alloy layer becomes disordered, thus deteriorating the magnetic characteristics.

Thus, in the case where the second ferromagnetic film and the magnetoresistive film have different lattice structures, this problem can be solved by inserting, as a third ferromagnetic film between these two films, a noncrystalline magnetic alloy layer having no special lattice structure. In the above case of the Fe layer and the Ni-Fe alloy layer, by inserting, as a noncrystalline magnetic alloy between these two layers, a Co-Zr-Mo alloy film having a thickness of 200 angstroms, it is possible to magnetically couple the domain suppressing layer with the magnetoresistive film, without deteriorating the magnetic characteristics of the magnetoresistive film.

The material to be used for the antiferromagnetic film will now be explained. In this example, a Fe-Mn alloy was used for the antiferromagnetic film, which is, however, remarkably poor in corrosion resistance. It is possible to improve the corrosion resistance by adding to the Fe-Mn alloy approximately 10% of one metal selected from the group consisting of Pd, Pt, Rh, Ir, Ru, Os and Re. Thus even if one metal selected from Pt and so on is added, it is possible to manufacture the domain suppressing layer in exactly the same manner as in the case of the Fe-Mn alloy.

Alternatively, nickel oxide or a Cr-Mn alloy may be used for the material of the antiferromagnetic film. In this case, however, it is necessary to change the material of the first and second ferromagnetic films with a material matching with an antiferromagnetic material. Following is an example in which a Cr-Mn alloy is used for the material of an antiferromagnetic film.

The lattice structure of a Cr-Mn alloy is a body-centered cubic structure. Therefore, if a Ni-Fe alloy layer is used for the first ferromagnetic film, its lattice structure is a face-centered cubic structure. Therefore, the lattice structure of the Cr-Mn alloy layer as the antiferromagnetic film is out of order so that an antiferromagnetic characteristic can be obtained only nonstably. For the same reason, it is also preferable that the second ferromagnetic film to be formed over the Cr-Mn alloy layer should have the same lattice structure as the Cr-Mn alloy layer. If a Cr-Mn alloy is to be used for the antiferromagnetic film, it is preferable that the first and third ferromagnetic films should be a metal having a body-centered cubic structure, such as Fe.

Assuming that the second ferromagnetic film is a magnetic metal having a body-centered cubic structure, its lattice structure is different from that of a Ni-Fe alloy used as the magnetoresistive film so that the lattice structure of a Ni-Fe alloy as the magnetoresistive film will be out of order. Consequently, it is preferable that a noncrystalline magnetic metal layer as a third ferromagnetic film should be formed over the second ferromagnetic film. Alternatively the second ferromagnetic film may be a noncrystalline alloy layer, which produces the same result.

The material for the magnetoresistive film will now be explained. A Ni-Fe-Co alloy, whose electric resistance varies remarkably with respect to the change of magnetic field, compared to the above-mentioned Ni-Fe alloy, may be used for the magnetoresistive film. In this case, it is preferable that the second ferromagnetic film of the domain suppressing layer also should be a Ni-Fe-Co alloy layer so that the lattice structure of the magnetoresistive film is not disordered very much, thus causing a stable magnetic coupling.

Figure 4:
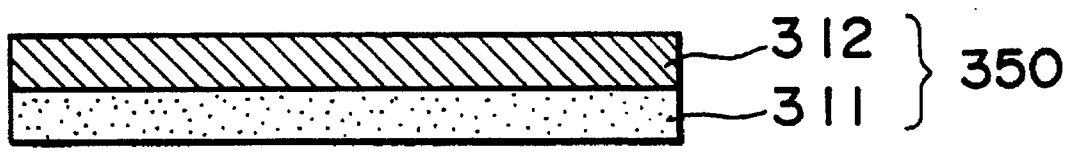
FIG. 4 is an enlarged cross-sectional view showing a modified domain suppressing layer.

The relationship between the magnetoresistive film and the intensity of the coupled field, which represents the quantity of shift of the magnetization curve of the ferromagnetic film due to the antiferromagnetic-ferromagnetic coupling, will now be explained. The optimum intensity of the coupled field due to the domain suppressing layer is determined according to the size, namely thickness, width and length, of the magnetoresistive film. If the intensity of the coupled field is lower than a level which is enough to keep each end of the magnetoresistive film in a single domain state and is smaller than a value needed to apply a longitudinal bias field to the film end, domains will occur in the magnetoresistive film. On the other hand, if it is much larger than the needed value, the sensitivity of field detection of the magnetoresistive film will be lowered. In the magnetoresistive head of this invention, it is possible to vary the intensity of the coupled field by changing the thickness of the second ferromagnetic film of the domain suppressing layer. Assuming that usually a magnetoresistive film for a narrow-track magnetoresistive head has a width of 5 µm, a length of 90 µm, an end (at which the domain suppressing layer is located) length of 30 µm, a central magnetosensitive region length of 30 µm and a thickness of 400 angstroms, the magnetoresistive film will not be made a single domain unless the intensity of the coupled field is at least 10 oersteds. Therefore, as shown in FIG. 3, the thickness of the second ferromagnetic film should be at most 600 angstroms, preferably 400 angstroms. The domain suppressing layer of this magnetoresistive head causes a stepped portion at each end of the magnetoresistive film, which acts so as to prevent the magnetoresistive film from being made a single domain. Consequently, it is preferable that the thickness of the antiferromagnetic film should be at most 400 angstroms so that such a stepped portion as a whole will be about two times FIG. 4 shows a modified domain suppressing layer 350. The domain suppressing layer 350 has a two-layer structure composed of a lower layer (to be previously formed) as an antiferromagnetic film 311, and an upper layer as a ferromagnetic film 312. For production, the first antiferromagnetic film 311 is formed so as to have a thickness of 100 to 400 angstroms, and then the second ferromagnetic film 312 is formed so as to have a thickness of 100 to 400 angstroms. For production of either layer, a conventional film-making technology may be used.

The materials for these layers will now be explained. For the antiferromagnetic film 311, nickel oxide or a Cr-Mn alloy, for example, which enables the formation of a stable antiferromagnetic film even in the absence of a ground layer, may be used. A Fe-Mn alloy, for example, which enables the formation of a stable antiferromagnetic phase only in the presence of a ground layer having a specific lattice structure, cannot be used for the antiferromagnetic film in this example. The antiferromagnetic film 311 and the ferromagnetic film 312 should preferably have the same lattice structure. For example, if a Cr-Mn alloy is used for the material of the antiferromagnetic film, a magnetic metal such as Fe having a similar lattice structure should be used for the material of the ferromagnetic film. In this case, however, since the lattice structure of the ferromagnetic film is different from that of a Ni-Fe alloy to be used for the magnetoresistive film, the magnetic characteristics of the magnetoresistive film will be deteriorated. Such problem can be eliminated by inserting a noncrystalline magnetic alloy layer, such as a Co-Zr-Mn film having a thickness of about 200 angstroms.

Figure 5:
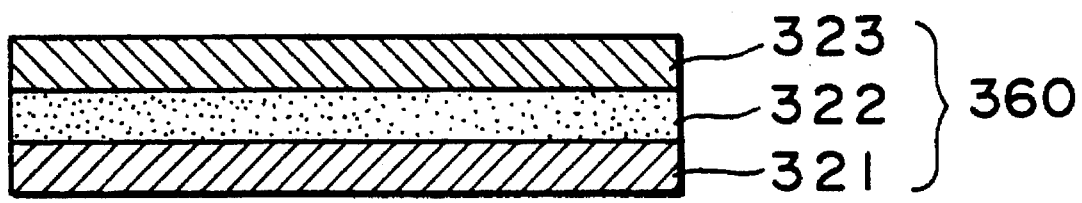
FIG. 5 is an enlarged cross-sectional view showing another modified domain suppressing layer.

In this example, while the antiferromagnetic film 311 is being formed, there exists no ferromagnetic film for orienting the spin direction (direction of magnetic moment) in a specific direction. For the spin ordering of the antiferromagnetic film 311, it is necessary that a domain suppressing layer 350 should be heated up to above the Néel temperature of the antiferromagnetic film 311 and then cooled down to below the Néel temperature by applying a magnetic field. FIG. 5 shows another modified domain suppressing layer 360. The domain suppressing layer 360 has a three-layer structure which includes a lower layer (to be previously formed) as a nonmagnetic crystalline film 321, an intermediate layer (to be formed on the lower layer) as an antiferromagnetic film 322, and an upper layer (to be formed on the intermediate layer) as a ferromagnetic film 323.

For production, using a conventional film-making technology, firstly the nonmagnetic crystalline layer 321 is formed, and thereover the antiferromagnetic film 322 is formed, and thereover the ferromagnetic film 323 is formed.

In this domain suppressing layer 360, in order to form the antiferromagnetic film 322 stably, a nonmagnetic crystalline film 321 having the same lattice structure as that of the antiferromagnetic film 322 is previously formed as a ground layer. For example, if a Fe-Mn alloy is to be used for the antiferromagnetic film 322, copper having the same face-centered cubic structure as that of the Fe-Mn alloy should be used as the nonmagnetic crystalline film 321. If a Cr-Mn alloy is to be used for the antiferromagnetic film 322, Cr should be used as the nonmagnetic crystalline layer 321 so that the antiferromagnetic film 322 can be formed stably. In this case, as in the previous case, since there exists no ferromagnetic film for causing the ordering of the spin direction, the domain suppressing layer 360 should be heated to above the Néel temperature of the antiferromagnetic film 322 and should then be cooled down to below the Néel temperature by applying a magnetic field, thus causing spin ordering of the antiferromagnetic film 322.

In the magnetoresistive head of this invention, since the domain suppressing layer is formed only under each end of the magnetoresistive film, there is no possibility that an anistoropic field at the central signal detection portion of the magnetoresistive film might be increased. Consequently, the signal detecting sensitivity of the magnetoresistive element is the same degree as that in the absence of any domain suppressing layer so that the high-sensitivity characteristic of the magnetoresistive head is prevented from being deteriorated. This domain suppressing layer serves to keep the end of the magnetoresistive film in a single domain state, and as a result, domains even at the central signal detection portion of the magnetoresistive film are suppressed, thus causing no domain wall. Thus in the magnetoresistive film, it is possible to suppress any Barkhausen noise which might occur due to the movement of a domain wall.

Since the domain suppressing layer is formed and processed before forming the magnetoresistive film, there is no possibility that the magnetoresistive film might be damaged while the domain suppressing layer is being formed. Further, since the uppermost film of the domain suppressing layer is a ferromagnetic film, it is possible to magnetically couple the domain suppressing layer with the magnetoresistive film, without using a cleaning means. With this magnetoresistive head, partly since the magnetoresistive film is free from any damage, and partly since any fluctuation of thickness and any nonstable surface state, which might have been caused by cleaning, of the magnetoresistive film are eliminated, it is possible to present a stable characteristic so that the yield of the magnetoresistive head can be improved.

In the domain suppressing layer of this magnetoresistive head, the intensity of the coupled field between the antiferromagnetic film and the magnetoresistive film can be controlled by varying the thickness of the ferromagnetic film formed over the antiferromagnetic film. Thus it is possible to determine the intensity of the coupled field to a desired value; that is, the value of the coupled field can be determined to an optimum that should be defined by the sizes of both the magnetoresistive film and the domain suppressing layer.

Further, in the domain suppressing layer, a wide range of selection for the material of the antiferromagnetic film is possible by changing the lower layer under the antiferromagnetic film and the upper layer as the ferromagnetic film over the antiferromagnetic film. For the material of the antiferromagnetic film, a Cr-Al alloy, a Cr-Mn alloy or nickel oxide, for example, which has excellent corrosion resistance, can be used, thus improving the reliability of the magnetoresistive head.

In the method of manufacturing this magnetoresistive head, a nonstable antiferromagnetic-ferromagnetic coupling portion of the exchange coupling can be manufactured continuously in the same vacuum container, without being exposed to the atmosphere. As a result, since the coupling between the antiferromagnetic and ferromagnetic films is excellent in reproducibility, it is possible to improve the yield of the magnetoresistive head. Further, in this method, the domain suppressing layer as an undivided whole can be patterned, without any damage in the magnetoresistive film, so that the magnetoresistive head can be manufactured in a simple manner.

With the magnetoresistive head of this invention, partly since here occurs no Barkhausen noise, which might have been caused by the movement of a domain wall of the magnetoresistive film, and partly since the magnetic characteristics are uniform, recording and reproducing onto and from the recording medium can be performed with a high recording density. Therefore, using this magnetoresistive head, it is possible to manufacture a high-recording-density and large-capacity magnetic disk apparatus.

What is claimed is:

1. A magnetoresistive head comprising:
   (a) a substrate;
   (b) electrodes;
   (c) a magnetoresistive film; and
   (d) a domain suppressing layer disposed only at each of opposite end portions of said magnetoresistive film for making said magnetoresistive film a single domain, wherein said domain suppressing layer is a three-layer film including a first layer comprised of one of a first layer ferromagnetic film and a nonmagnetic crystalline film, a second layer comprised of an antiferromagnetic film and a third layer comprised of a third layer ferromagnetic film which are laminated over one another in this order, said third layer ferromagnetic film being in contact with said magnetoresistive film.

2. A magnetoresistive head according to claim 1, wherein said domain suppressing layer is a four-layer film including said first layer, said second layer, an intermediate ferromagnetic film, and said third layer ferromagnetic film which are laminated over one another in this order.

3. A magnetoresistive head according to claim 2, wherein said first layer ferromagnetic film and said third layer ferromagnetic film each comprises one alloy selected from a group consisting of a Ni-Fe alloy and a Ni-Fe-Co alloy, and said third ferromagnetic film comprises a noncrystalline Co alloy.

4. A magnetoresistive head according to claim 1, wherein said first layer ferromagnetic film and said third layer ferromagnetic film are identical with each other and each comprises one alloy selected from a group consisting of a Ni-Fe alloy and a Ni-Fe-Co alloy.

5. A magnetoresistive head according to claim 1, wherein said third layer ferromagnetic film comprises a noncrystalline Co alloy.

6. A magnetoresistive head according to claim 1, wherein said first layer ferromagnetic film comprises one alloy selected from a group consisting of a Ni-Fe alloy and a Ni-Fe-Co alloy, and said third layer ferromagnetic film comprises a noncrystalline Co alloy.

7. A magnetoresistive head according to claim 1, wherein said antiferromagnetic film comprises one alloy selected from a group consisting of an Fe-Mn alloy, an Fe-Mn-Pd alloy, an Fe-Mn-Pt alloy, an Fe-Mn-Rh alloy, an Fe-Mn-Ir alloy, an Fe-Mn-Ru alloy, an Fe-MnOs alloy and an Fe-Mn-Re alloy.

8. A magnetoresistive head according to claim 1, wherein said antiferromagnetic film is identical in lattice structure with said third layer ferromagnetic film.

9. A magnetoresistive head according to claim 1, wherein said antiferromagnetic film has a thickness of at most 400 angstroms.

10. A magnetoresistive head according to claim 1, wherein said third layer ferromagnetic film has a thickness of at most 400 angstroms.

11. A magnetoresistive head according to claim 1, wherein said third layer ferromagnetic film and said antiferromagnetic film have a combined field intensity of at least 10 oersteds.

12. A magnetoresistive head according to claim 1, wherein said third layer ferromagnetic film comprises one alloy selected from a group consisting a Ni-Fe alloy, a Ni-Fe-Co alloy and a noncrystalline Co alloy.

13. A magnetoresistive head according to claim 1, wherein said nonmagnetic crystalline film is identical in lattice structure with said antiferromagnetic film.

14. A magnetoresistive head according to claim 1, wherein said domain suppressing layer is located outside a track portion of said magnetoresistive film.

15. A magnetic disk apparatus having a magnetoresistive head according to claim 1.

16. A method for manufacturing a magnetoresistive head which has a domain suppressing layer only at each of opposite ends of a magnetoresistive film for making said magnetoresistive film a single domain, comprising the steps of:
   (a) forming said domain suppressing layer wherein said domain suppressing layer forming step includes a first step of forming a first layer comprised of one of a first layer ferromagnetic film and a nonmagnetic crystalline film, a second step of forming a second layer of an antiferromagnetic film over said first layer, and a third step of forming a third layer comprised of a third layer ferromagnetic film over said second layer;
   (b) shaping said domain suppressing layer into a target pattern by etching; and
   (c) forming said magnetoresistive film over said target pattern of said domain suppressing layer.

17. A method according to claim 16, wherein said domain suppressing layer forming step includes said first step, said second step an intermediate step of forming an intermediate ferromagnetic film between said second layer and said third layer, and said third step.

18. A method according to claim 17, wherein said antiferromagnetic film and said third layer ferromagnetic film to be formed thereover are formed successively within a single vacuum container.

19. A method according to claim 16, wherein said antiferromagnetic film and said third layer ferromagnetic film to be formed thereover are formed successively within a single vacuum container.

* * * * *